United States Patent [19]

Rickenbacker

[11] 4,184,144

[45] Jan. 15, 1980

[54] MEASUREMENT AND CONTROL OF THE OUTPUT FORCE OF A SEISMIC VIBRATOR

[75] Inventor: James E. Rickenbacker, Houston, Tex.

[73] Assignee: Exxon Production Research Company, Houston, Tex.

[21] Appl. No.: 853,156

[22] Filed: Nov. 21, 1977

[51] Int. Cl.² ............................................. G01V 1/14
[52] U.S. Cl. ................................. 367/137; 181/119; 181/121
[58] Field of Search ............... 181/121, 113, 114, 119; 340/17 R, 15.5 TA; 73/664

[56] References Cited

U.S. PATENT DOCUMENTS

| | | | |
|---|---|---|---|
| 3,045,476 | 7/1962 | Bell | 73/664 |
| 3,141,325 | 7/1964 | Hajian | 73/664 |
| 3,208,550 | 9/1965 | Castanet et al. | 340/17 |
| 3,216,525 | 11/1965 | Fail et al. | 340/17 |
| 3,761,874 | 9/1973 | Landrum, Jr. | 73/664 |
| 3,840,090 | 10/1974 | Silverman | 181/119 |
| 3,854,118 | 12/1974 | Pelton | 340/17 |
| 3,881,167 | 4/1975 | Pelton et al. | 340/15.5 TC |
| 4,049,077 | 9/1977 | Mifsud | 181/114 |
| 4,063,613 | 12/1977 | Silverman | 181/114 |

*Primary Examiner*—Howard A. Birmiel
*Attorney, Agent, or Firm*—E. Eugene Thigpen

[57] ABSTRACT

A system for controlling the force imparted to the ground by a seismic vibrator. A signal is generated which is related to the peak force imparted to the earth and the control signal amplitude is varied in response thereto to achieve the desired force magnitude.

19 Claims, 6 Drawing Figures

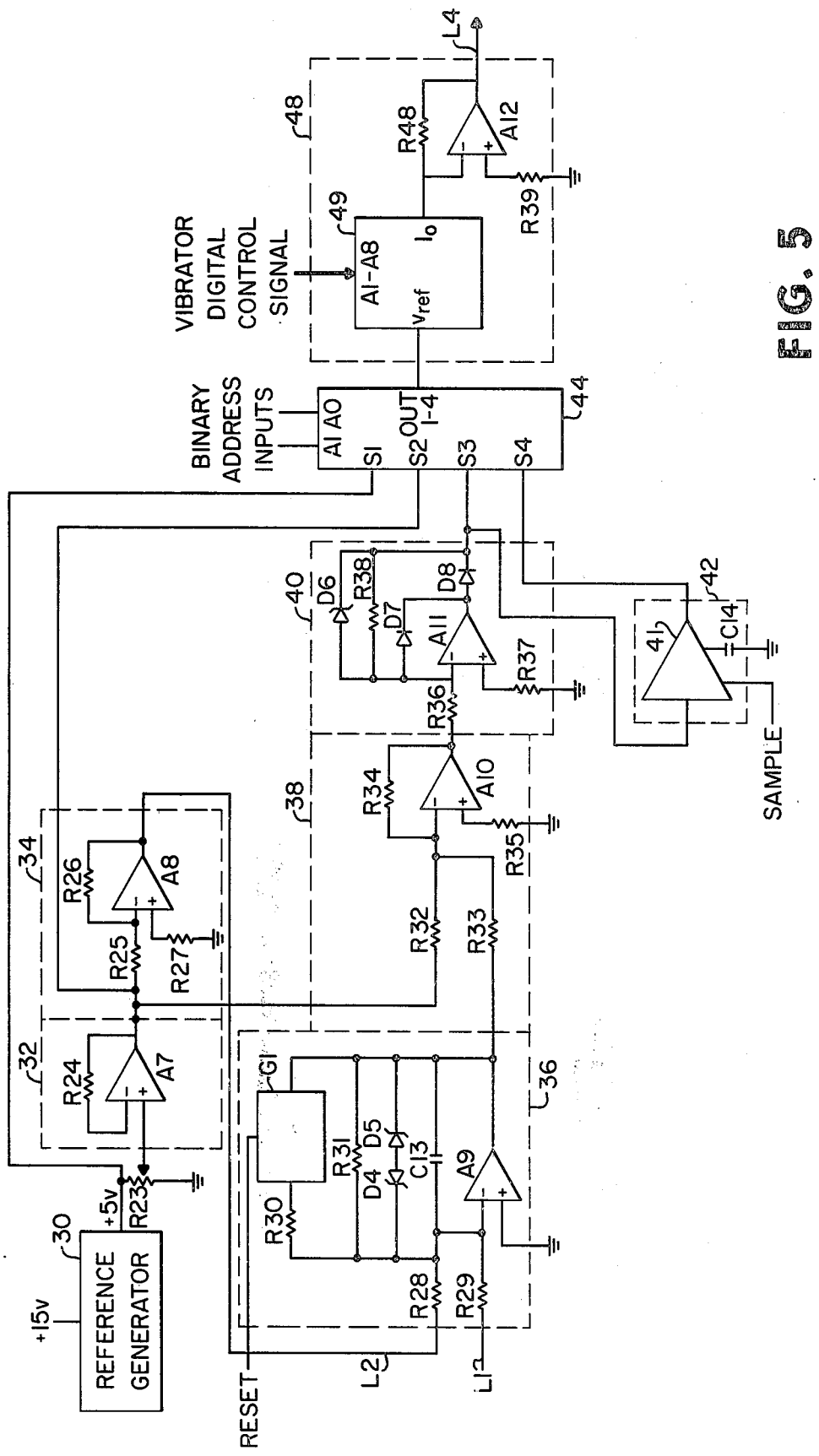

MEASUREMENT AND CONTROL OF THE OUTPUT FORCE OF A SEISMIC VIBRATOR

BACKGROUND OF THE INVENTION

1. Field of the Invention

The present invention relates to vibratory seismic energy sources used for seismic prospecting. More particularly, it relates to a system for controlling the vibratory force imparted to the ground.

2. Description of the Prior Art

In seismic prospecting, it has become common to use, as a seismic wave source, an electrohydraulically controlled vibratory source, more simply referred to as a vibrator.

Typically, a vibrator comprises a double-ended piston rigidly affixed to a coaxial piston rod. The piston is located in reciprocating relationship in a cylinder formed within a heavy reaction mass. Means are included for alternately introducing hydraulic fluid under high pressure to opposite ends of the cylinder, thereby imparting a recirocating motion to the piston relative to the reaction mass. The piston rod extending from the reaction mass is rigidly coupled to a ground coupling plate (hereinafter baseplate) which is maintained in intimate contact with the gound. The inertia of the reaction mass tends to resist displacement of the reaction mass relative to the earth. The motion of the piston is coupled through the piston rod and baseplate to impart vibratory seismic energy in the earth.

Typically, a vibrator is vehicle mounted. Upon arrival at a selected location, the baseplate is lowered into contact with the earth's surface, and to prevent decoupling of the baseplate from the ground during operation, a portion of the vehicle's weight is applied to the baseplate. The weight of the vehicle is frequently applied to the baseplate through one or more spring members so that a static bias force is imposed on the baseplate while the dynamic forces of the baseplate are decoupled from the vehicle.

Because of variation in the earth's impedance at different locations, and variations in impedance with frequency at a given location, the maximum vibrator baseplate motion that can be generated while keeping the baseplate in contact with the ground may vary considerably depending on the soil conditions and the frequency. Normally, drive levels are now set by trial and error; that is, if the baseplate is observed to decouple from the ground, the drive level is decreased; if it doesn't, the drive level might be increased.

Typically, the vibrator is driven with a "swept sine" wave in a manner well known to the industry. With this form of signal the phase of the input signal is controlled by a feedback control loop, but feedback is not used to control the vibratory amplitude.

It has been proposed that the vibratory amplitude be controlled by controlling the instantaneous motion of the baseplate. Castanet, et al, in U.S. Pat. No. 3,208,550 proposes to generate a signal proportional to force generated by the baseplate and utilize this signal in a feedback network to vary the instantaneous drive level to the vibrator. Mifsud, in U.S. Pat. No. 4,049,077, proposes to generate a feedback signal equal to the instantaneous amplitude of either coupling plate velocity or displacement and utilize one of these feedback signals to control the instantaneous motion of the coupling plate.

The system proposed by Castanet, et al, may be difficult to implement because variations in ground impedance at different locations and variations in ground impedance with frequency tend to make such a control loop unstable. When utilizing the control loop of Mifsud, it is necessary to determine in advance, for a particular location, the maximum velocity or displacement amplitude that can be generated over the frequency range of interest without decoupling of the baseplate from the ground.

SUMMARY OF THE INVENTION

A signal is generated which is related to the instantaneous force imparted to the ground by a vibrator baseplate. This signal is utilized to control the force generated by the vibrator so that the desired signal level may be imparted to the ground.

In a first embodiment of the invention, the acceleration of the baseplate and the acceleration of the reaction mass are detected, and a signal related to the peak force transmitted by the baseplate is generated therefrom. This signal related to peak force is displayed on a visible indicator device, which may be a voltage meter. The amplitude of the input signal to the vibrator may be adjusted manually to achieve the desired vibratory force, which typically may be the maximum force that can be injected into the ground without decoupling of the baseplate from the ground.

In a second embodiment of the invention, the signal related to the peak force transmitted by the baseplate is utilized in a control network to automatically vary the amplitude of the input signal to the vibrator to achieve the desired vibratory force.

BRIEF DESCRIPTION OF THE DRAWINGS

FIG. 5 is a schematic illustration of the block diagram shown in FIG. 2.

DESCRIPTION OF THE PREFERRED EMBODIMENTS

Figure 1:
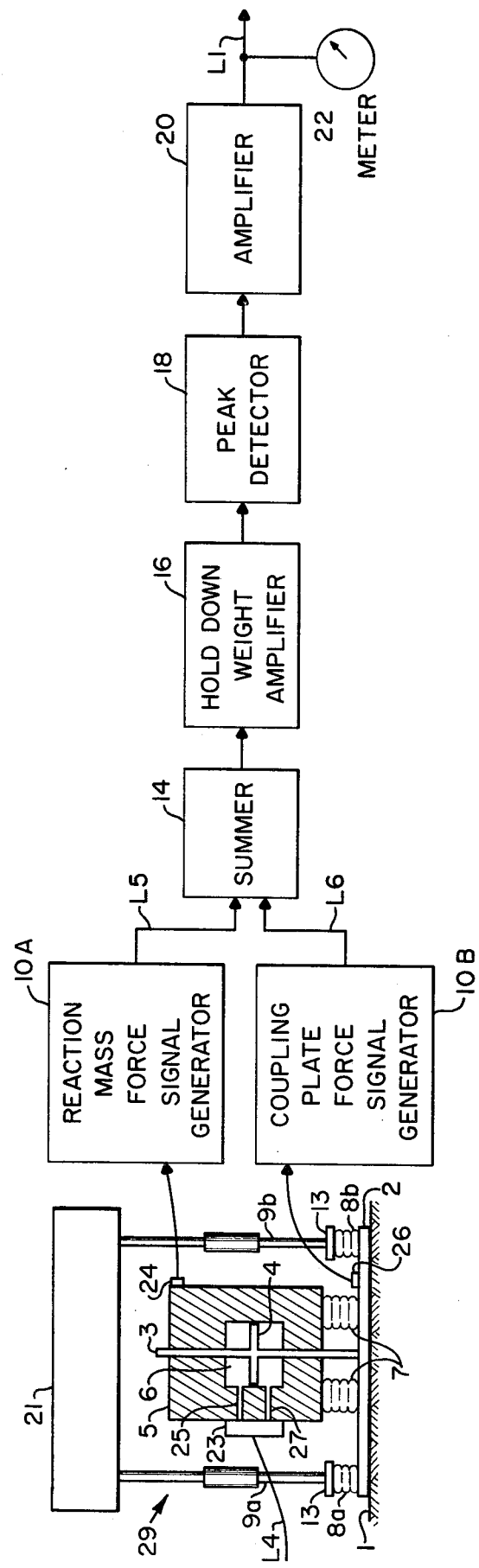
FIG. 1 shows a block diagram of an embodiment of the invention.

FIG. 1 shows a block diagram of an embodiment of applicant's invention. A seismic vibrator, designated by numeral 29, employs a coupling plate (baseplate) 2 in contact with the earth's surface 1. The baseplate is held against the earth's surface by the weight of a heavy mass 21, commonly referred to as a holddown weight, which normally comprises the vibrator transport vehicle. This weight is applied to the baseplate through rods 9a and 9b which may comprise a portion of the hydraulic mechanism which lowers the vibrator to the ground for vibrating the earth and which lifts the vibrator into position for moving to another location. See, for example, U.S. Pat. No. 3,306,391. These rods are affixed at the lower ends thereof to a support structure 13, and the holddown weight is coupled to the baseplate through springs 8a and 8b, which normally are air bags.

The vibrator hydraulic actuator includes a power piston 4 connected to the baseplate 2 by means of piston rod 3, the power piston being adapted for reciprocating movement within cylinder 6. The housing for cylinder 6 includes a heavy reaction mass 5. an electrohydraulic servovalve 23 is provided for applying hydraulic pressure to one side or the other of piston 4 through ports 25 and 27. Servovalve 23 operates in response to an electrical input signal in a mannner well known in the art. See, for example, U.S. Pat. No. 3,208,545.

During operation of the vibrator, the hydraulic drive generates two forces of equal magnitude and opposite direction on the reaction mass and on the piston, which is connected to the baseplate. These forces will be referred to respectively as $F_m$ and $F_b$. Designating $A_m$ and $A_b$ as the respective accelerations of the reaction mass and baseplate, and $M_b$ as the mass of the baseplate (including the piston, piston rod, and any mass moving therewith), and $M_m$ as the mass of the reaction mass, the force equations may be written:

$$F_m = M_m A_m$$

$$F_b = M_b A_b + F_o$$

where $F_o$ is the force imparted to the earth. And, since $F_m = -F_b$, $$-F_o = M_b A_b + M_m A_m$$

The force imparted to the ground, therefore, can be determined by generating signals proportional to baseplate acceleration and reaction mass acceleration, multiplying these two signals by a factor equivalent to the respective masses of the baseplate and reaction mass, and combining the two resulting signals.

It is apparent that when the peak force generated in the upward direction equals the force tending to hold the baseplate on the ground, the baseplate begins to decouple from the ground. This holddown force comprises essentially the entire weight of the vibrator and transport vehicle. For any individual vibrator the value of the holddown force will normally be known.

To generate a signal proportional to reaction mass acceleration, accelerometer 24 is attached to reaction mass 5. And to generate a signal proportional to baseplate acceleration, accelerometer 26 is attached to coupling plate 2 (baseplate). The output from accelerometer 24 is connected to reaction mass force signal generator 10A whose output is connected to an input of summer 14. The output from accelerometer 26 is connected to baseplate force signal generator 10B whose output is connected to the second input of summer 14. The electrical circuits comprising reaction mass force generator 10A and coupling plate force signal generator 10B may be substantially identical and are illustrated in more detail in FIG. 3, which will be discussed further hereinafter.

Summer 14 algebraically sums the output signals from the two force signal generators. The output of summer 14 is amplified by holddown weight amplifier 16.

Holddown weight amplifier 16 is followed by peak detector 18 which generates an output signal which follows the peak amplitude of the holddown weight amplifier output. The output of amplifier 16 represents the peak amplitude of the force signal imparted to the earth. Preferably, peak detector 18 generates an output which follows the peak force in the downward direction, because the signal representing peak force in the upward direction may have distortion if the baseplate leaves the ground.

The output from peak detector 18 is amplified in amplifier 20 whose output drives meter 22. Meter 22 can be observed to determine if the force being generated by the vibrator is of the desired magnitude.

Figure 3:
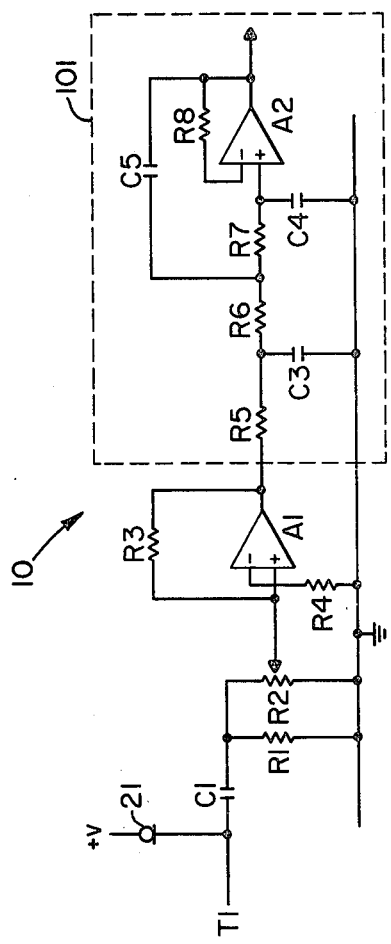
FIG. 3 is a schematic illustration of a portion of the system shown in FIG. 1.

FIG. 3 shows a schematic illustration of the circuit comprising reaction mass force signal generator 10A and coupling plate force signal generator 10B. This circuit includes constant current generator 21 which may be an MCL 1304 Constant Current Diode made by Motorola. The current from each constant current source flows through its respective accelerometer device, mounted on the vibrator reaction mass or on the baseplate. These accelerometers, which may be Model No. 816A6 accelerometers, manufactured by Kistler, a division of Sundstrand Corp., generate a voltage output signal which varies as a function of acceleration. This voltage signal is coupled through capacitor C1 to the input of amplifier A1. By varying the position of the wiper contact of potentiometer R2, the input signal to amplifier A1 can be varied in relation to the mass of the coupling plate or the reaction mass to which the accelerometer is connected. The output signal from amplifier A1, then, is proportional to mass times acceleration. The output signal from amplifier A1 is then applied to a three-pole, low-pass filter 101 which may have a cutoff frequency a little above the vibrating frequency range of interest, to filter out high frequency noise. Tje output signal from the reaction mass force signal generator 10A, then, has an amplitude substantially equivalent to the instantaneous force of the reaction mass ($M_m A_m$). The output signal from the coupling plate force signal generator 10B has an amplitude substantially equivalent to the instantaneous force of the baseplate ($M_b A_b$).

Figure 4:
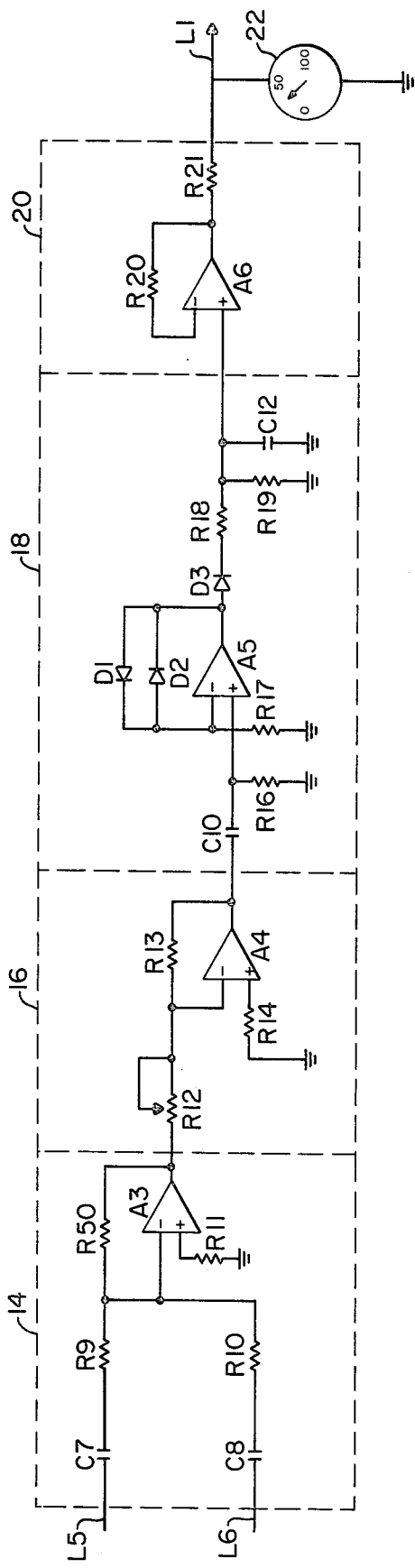
FIG. 4 is a schematic illustration of a portion of the system shown in FIG. 1.

FIG. 4 shows summer 14, holddown weight amplifier 16, and peak detector 18 in more detail. The output signals from reaction mass force signal generator 10A and coupling plate force signal generator 10B are AC coupled through capacitors C7 and C8, respectively, to summer 14, to remove DC offset. The output of summer 14 is the signal, $F_o$, which represents the force imparted to the earth.

Amplifier 16 comprises a variable gain amplifier, the gain of which is varied by means of variable resistor R12. This variable gain enables the overall gain in the system to be adjusted to facilitate use of the system disclosed herein with vibrators having different holddown weights when it is desired to display the force being imparted to the ground as a percent of the maximum force that can be generated without decoupling of the baseplate from the earth. For example, if display meter 22 indicated full scale at an output voltage from amplifier 20 of five volts, it would be desirable to adjust the impedance of resistor R12 such that the peak force at which decoupling occurs would yield an output voltage from amplifier 20 of five volts, whether this decoupling force were 20,000 lbs or 30,000 lbs for the particular vibrator.

The signal output from holddown weight amplifier 16 is applied to peak detector 18. Peak detector 18 comprises a non-inverting amplifier. Diode D3, connected to the output of operational amplifier A5 prevents reverse current flow with the result that capacitor C12 maintains an output voltage substantially equal to the positive peak voltage at the peak detector input. Diode D2 compensates for the voltage drop across diode D3. Diode D1 provides a current path from the amplifier output during the negative portion of the input signal to the peak detector. Values for capacitor C2, and resistor R18 and R19 may be selected by methods known to those of ordinary skill in the art to achieve the desired response time.

Display meter 22, which may be a standard microamp meter, may preferably be calibrated in percent of maximum force that can be generated without decoupling of the vibrator baseplate from the ground. This meter may also be calibrated to indicate the magnitude of the generated force. This meter will normally be mounted on the transport vehicle so that it is visible to the operator. The operator is enabled to manually adjust the level of the input control signal to the electrohydraulic servovalve such that the peak generated output force of the vibrator is at a selected level. This selected level frequently will be the maximum level at which the vibrator can operate without decoupling of the baseplate from the ground.

In a second embodiment of the invention, the signal representing the peak force generated by the vibrator is utilized to automatically control the amplitude of the input control signal to the electrohydraulic servovalve.

Typically, the input control signal for the vibrator is stored, in a manner known to the art, in some memory device such as a semiconductor read-only-memory in the form of a series of digital words. These digital words are converted to equivalent analog levels to control the vibrator. In the system disclosed herein, with reference to FIGs. 2 and 5, the digital words comprising the control signal are applied serially to multiplying digital to analog converter 48, which may include an MC1408 device made by Motorola, designated by numeral 49, via input terminals A1–A8 thereto. The signal applied to control terminal $V_{ref}$ thereof varies the conversion ratio of the resulting analog signal to the input digital signal. The output signal from multiplexer 44 is applied to this control terminal ($V_{ref}$). The multiplying digital to analog converter includes a buffered output comprising amplifier A12. The output signal from the multiplying digital to analog converter is applied to servovalve 23 via line 4 for controlling instantaneous motion of the vibrator baseplate.

Figure 2:
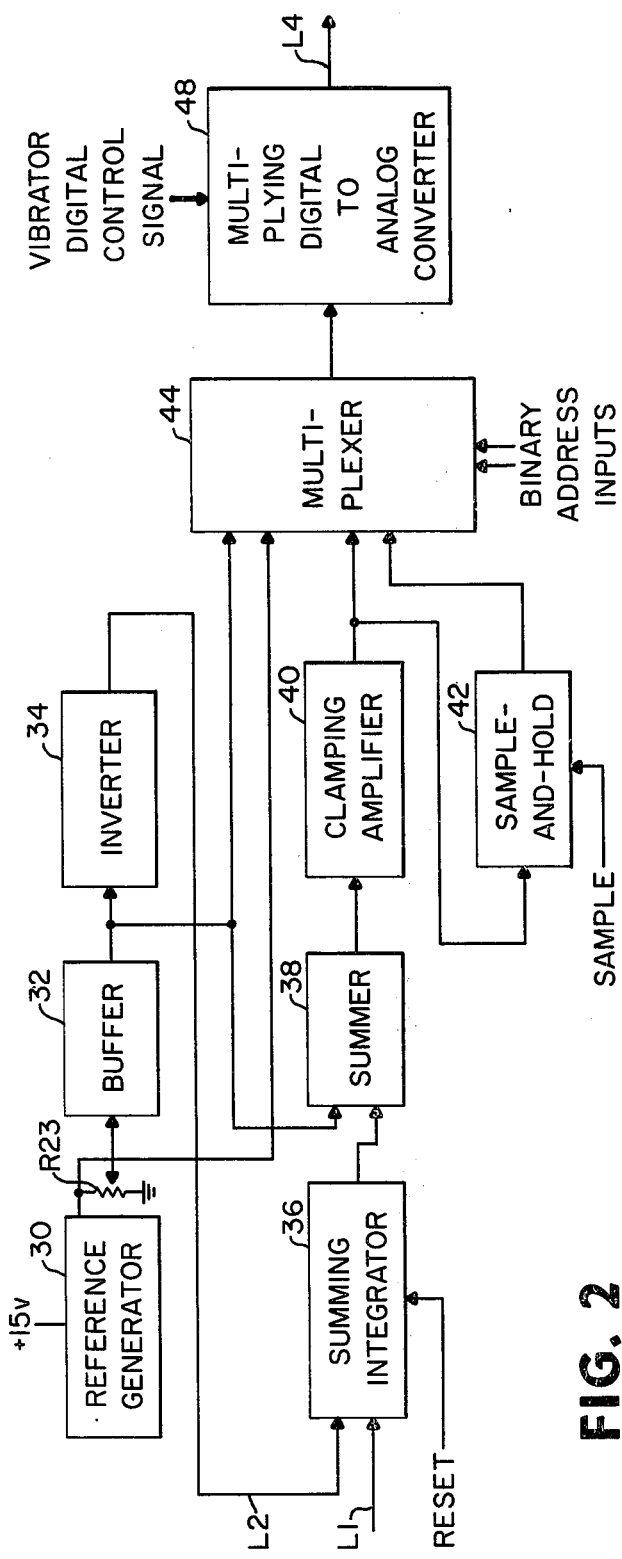
FIG. 2 is a block diagram of a portion of a second embodiment of the invention.

As shown in FIGS. 2 and 5, a precision voltage output signal is generated by a reference generator 30, which may be a REF-02 device manufactured by PMI (Precision Monolithics, Inc.). The output signal from reference generator 30 is applied to one input of multiplexer 44. When it is desired to operate the vibrator without utilizing the automatic control system disclosed herein, the binary address inputs to address input terminal A1 and A0 of the multiplexer will be selected to transfer the signal from reference generator 30 to the multiplexer output. In this mode, a constant voltage level will be applied to the $V_{ref}$ terminal of the multiplying digital to analog converter and the conversion ratio between the digital input and the analog output thereof will remain constant.

When utilizing the automatic control system disclosed herein, the output from reference generator 30 is modified by the output from amplifier 20, which represents the actual peak force imparted to the ground, to automatically vary the input control signal to the servovalve to the amplitude required for generating the selected peak force. The input control signal from reference generator 30 is applied to a terminal of potentiometer R23 and the wiper contact from this potentiometer is connected to the (+) plus terminal of unity gain buffer 32. The output of buffer 32 is the nominal signal which is applied to $V_{ref}$ terminal of multiplying digital to analog converter 48 to control the amplitude of the input control signal to the vibrator. Potentiometer R23 enables an operator to selectively vary the input control signal amplitude to the vibrator. The output of buffer 32 is applied to inverter 34 which generates a signal of equal amplitude but of opposite polarity to its input signal. The output of inverter 34 then is summed with the signal on line L1 which, as explained previously, is the output from amplifier 20 and represents the peak force transmitted to the ground by the vibrator baseplate, and these combined signals are integrated by integrator 36. Those of ordinary skill in the art will recognize that if the signal which is fed back to integrator 36 on line L1 is equal and of opposite polarity to the signal on line L2, the generated force is equal to the selected force and the output of integrator 36 will remain at a constant level. The zener diodes D4 and D5 included in integrator 36 protect the output from exceeding voltage levels which might damage the multiplying digital to analog converter. Integrator 36 also includes a gate G1, which may be an A97502 device made by Analog Device, to reset the integrator at selected times, normally at the beginning of a vibratory transmission cycle.

The voltage level at the output of buffer 32 is applied to one input of summing amplifier 38. The other input to this summing amplifier is the output from integrator 36. The output of buffer 32, as stated above, is the nominal reference voltage level which selects the peak force of the baseplate vibratory transmissions. The output from integrator 36 is a feedback signal which fine tunes the amplitude of the electrical input control signal to the vibrator servodrive. Resistors R28 and R29 and capacitor C13 are selected by methods known to those of ordinary skill in the art to achieve the desired response time in the feedback loop.

The output from summing amplifier 38 is applied to clamping amplifier 40 which inverts the control signal to restore it to the required polarity. Amplifier 40 also included elements (diodes D6, D7, and D8) which prevent the output thereof from exceeding voltage levels which would drive the vibrator beyond a safe operating range. The output signal from clamping amplifier 40 is applied to an input of multiplexer 44 and to the input of sample and hold circuit 42. The function of sample and hold circuit 42 will be described more completely hereinafter.

Figure 6:
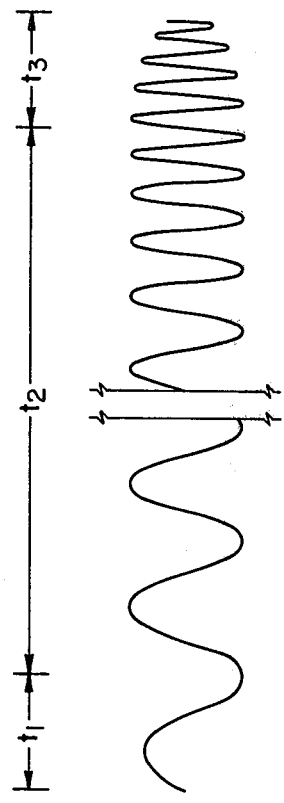
FIG. 6 shows a typical "swept sine" vibratory waveform that might be injected into the earth.

Multiplexer 44 operates as follows. FIG. 6 shows a typical "swept sine" waveform frequently used in seismic exploration. During the major portion of the transmission time, the output signal from amplifier 40 will control the conversion ratio of multiplying digital to analog converter 48. At the beginning of the waveform, however, it may be desirable to gradually increase the peak force level of the vibratory transmission from zero up to a selected amplitude. At the end of this vibrating sequence it may be desirable also to taper gradually from this selected level back to zero force level. In the embodiment described herein, the multiplexer is controlled by standard control circuits of a type known to those of ordinary skill in the art such that the signal from buffer 32 is applied to the $V_{ref}$ input of the multiplying digital to analog converter during the initial or "taper up" portion of the vibration sequence, designated in FIG. 6 as "$t_1$." During the major portion of the transmission time, designated in FIG. 6 as "$t_2$," the output of amplifier 40 is applied, through multiplexer 44, to the $V_{ref}$ terminal of the multiplying digital to analog converter. During the final or "taper down" stage of the vibration sequence, described in FIG. 6 as "$t_3$," the output from sample and hold circuit 42 is applied through the multiplexer to said $V_{ref}$ terminal. Just prior to the taper down portion of the cycle, the output signal from clamping amplifier 40 is "sampled" by sample and hold circuit 42 and this level is retained during the time required to taper down. Sample and hold circuit 42 may comprise an LF198 sample and hold circuit made by National Semiconductor, designated by numeral 41 and "holding" capacitor C14. The "sampling" function is performed by applying an appropriate logic level change to the sample input to the sample and hold circuit in a manner well known to the art. During the taper down time, the sample and hold output signal is transferred to the output of multiplexer 44 so that during the taper down time the feedback loop will not attempt to increase the amplitude of the input control signal. During the taper up and taper down times, the digital words from which the input control signal to the servovalve is formed, contain the tapered amplitude information, and because of the varying amplitude of the input control signal, the feedback is not utilized during these portions of the vibratory cycle.

It will be recognized by those skilled in the art that other methods of achieving the tapering at the beginning and the ending of the cycle may be implemented. For example, reference signal 30 might be replaced by a function generator to generate a signal corresponding to the envelope of the signal waveform that it is desired to transmit. The output from amplifier 40 could then be applied to the control terminal ($V_{ref}$) of multiplying digital to analog converter throughout a vibration sequence. In this method, the tapering information would not be included in the digital words from which the input control signal is formed.

Although specific ways and means for practicing the invention have been described herein and illustrated in the accompanying drawings, it is nevertheless to be understood that this has been done for purposes of illustration only and that the scope of the invention is not limited thereby but is to be determined from the appended claims.

I claim:

1. In a method for injecting a seismic disturbance into the earth by means of a seismic vibrator wherein an electrohydraulic servo mechanism is used to reciprocally drive a coupling plate in response to an electrical input signal, an improved method for injecting a selected force magnitude to the earth comprising:
generating a signal having an amplitude which substantially follows the peak amplitude of the force imparted to the earth by said coupling plate; and
varying the amplitude of the electrical input signal to the vibrator in response to said signal having an amplitude which substantially follows the peak amplitude of the force imparted to the earth so as to achieve said selected force magnitude.

2. The method of claim 1 further comprising displaying the magnitude of said signal having an amplitude which substantially follows the peak amplitude of the force imparted to the earth and observing the magnitude of the displayed signal, wherein the amplitude of the electrical input signal to the vibrator is manually varied in response to the observed magnitude of the displayed signal.

3. The method of claim 2 wherein the peak force that can be imparted to the earth without decoupling of the coupling plate from the ground is known and wherein said signal having an amplitude which substantially follows the peak amplitude of the force imparted to the earth is displayed as a percent of the maximum force that can be imparted to the earth without decoupling of the coupling plate.

4. The method of claim 1 wherein the step of generating a signal having an amplitude which substantially follows the peak amplitude of the force imparted to the earth comprises generating a signal whose amplitude varies instantaneously with the force imparted to the earth and said signal having an amplitude which substantially follows the peak amplitude is generated in response thereto.

5. In a system for injecting a seismic disturbance into the earth by means of a seismic vibrator wherein an electrohydraulic servo mechanism is used to reciprocally drive a coupling plate in response to an electrical input signal, an improved method for controlling the force imparted to the earth by said coupling plate comprising:
generating a signal having an amplitude which substantially follows the peak amplitude of the force imparted to the earth by said coupling plate;
displaying said signal having an amplitude which substantially follows the peak amplitude of the force imparted to the earth;
observing the magnitude of the displayed signal; and
manually varying the magnitude of the electrical input signal to impart the desired force to the earth.

6. The method of claim 5 wherein the peak force that can be imparted to the earth without decoupling of the coupling plate from the ground is known and wherein said signal having an amplitude which substantially follows the peak amplitude of the force imparted to the earth is displayed as a percent of the maximum force that can be imparted to the earth without decoupling of the coupling plate.

7. The method of claim 5 wherein the step of generating a signal having an amplitude which substantially follows the peak amplitude of the force imparted to the earth comprises generating a signal whose amplitude varies instantaneously with the force imparted to the earth and said signal having an amplitude which substantially follows the peak amplitude is generated in response thereto.

8. In a method for injecting a seismic disturbance into the earth by means of a seismic vibrator wherein an electrohydraulic servo mechanism is used to reciprocally drive a coupling plate in response to an electrical input signal, an improved method for injecting a selected force magnitude to the earth comprising:
generating a first signal having an amplitude which substantially follows the peak amplitude of the force imparted to the earth by said coupling plate; and
varying automatically the amplitude of said input signal in response to said first signal to generate said selected force magnitude.

9. The method of claim 8 wherein the step of generating said first signal comprises generating a signal having an amplitude which varies instantaneously with the force imparted to the earth and said first signal having an amplitude which substantially follows the peak amplitude is generated in response thereto.

10. The method of claim 8 further comprising:

integrating said first signal thereby generating an integrated feedback signal;
generating a steady state reference signal;
summing said integrated feedback signal with said reference signal to generate a gain control signal for automatically varying the amplitude of said electrical input signal; and
converting a series of digital words into a corresponding analog signal comprising said electrical input signal, said digital to analog conversion having a conversion ratio therebetween which varies with the amplitude of said gain control signal.

11. The method of claim 10 further comprising resetting said integrated signal.

12. In a seismic vibrator wherein an electrohydraulic servo mechanism is used to reciprocally drive a coupling plate in response to an electrical input signal, the improvement comprising:
means for generating a signal having an amplitude which substantially follows the peak amplitude of the force imparted to the earth by said coupling plate; and
display means for displaying said signal having an amplitude which substantially follows the peak amplitude of the force imparted to the earth.

13. The apparatus of claim 12 wherein said display means comprises means for displaying said signal having an amplitude which substantially follows the peak amplitude of the force imparted to the earth as a percentage of the maximum force that can be imparted to the earth without decoupling of the coupling plate from the earth.

14. The apparatus of claim 12 wherein said means for generating a signal having an amplitude which substantially follows the peak amplitude of the force imparted to the earth comprises:
means for generating a signal having an amplitude which varies instantaneously with the force imparted to the earth; and
peak detecting means for generating a signal having an amplitude which substantially follows the peak amplitude of said signal having an amplitude which varies instantaneously with the force imparted to the earth.

15. In a seismic vibrator wherein an electrohydraulic servo mechanism is used to reciprocally drive a coupling plate in response to an electrical input signal, the improvement comprising:
first means for generating a first signal having an amplitude which substantially follows the peak amplitude of the force imparted to the earth by said coupling plate; and
second means for automatically varying the amplitude of said input signal in response to said first signal to impart a force to the earth having a selected peak magnitude.

16. The apparatus of claim 15 wherein said first means comprises:
means for generating a signal having an amplitude which varies instantaneously with the force imparted to the earth; and
peak detecting means for generating a signal having an amplitude which substantially follows the peak amplitude of said signal having an amplitude which varies instantaneously with the force imparted to the earth.

17. The apparatus of claim 15 wherein said second means further comprises:
means for integrating said first signal thereby generating an integrated feedback signal;
means for generating a steady state reference signal;
means for summing said integrated feedback signal with said reference signal to generate a gain control signal for automatically varying the amplitude of said input signal; and
a digital to analog converter for generating an analog signal from a corresponding digital signal, said analog signal comprising said input signal, and said digital to analog converter having a conversion ratio between said digital signal and said analog signal which varies with the amplitude of said gain control signal.

18. The apparatus of claim 17 further comprising means for resetting said integrating means.

19. In a seismic vibrator wherein an electrohydraulic servo mechanism is used to reciprocally drive a coupling plate in response to an electrical input signal, the improvement comprising:
means for generating a signal having an amplitude which varies instantaneously with the force imparted to the earth;
peak detecting means for generating a first signal having an amplitude which substantially follows the peak amplitude of said signal having an amplitude which varies instantaneously with the force imparted to the earth;
a digital to analog converter for generating an analog signal from a corresponding digital signal, said analog signal comprising said input signal, and said digital to analog converter having a conversion ratio between said analog signal which varies with the amplitude of a gain control signal;
means for generating a steady state reference signal;
means for integrating said first signal thereby generating an integrated feedback signal; and
means for summing said integrated feedback signal with said reference signal to generate said gain control signal for automatically varying the amplitude of said input signal to impart a force to the earth having a selected peak magnitude.

* * * * *